US012526365B1

(12) United States Patent
Springer

(10) Patent No.: US 12,526,365 B1
(45) Date of Patent: Jan. 13, 2026

(54) CONNECTING A USER OF A FIRST CONTACT CENTER TO A SECOND CONTACT CENTER

(71) Applicant: Zoom Communications, Inc., San Jose, CA (US)

(72) Inventor: Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 261 days.

(21) Appl. No.: 18/329,240

(22) Filed: Jun. 5, 2023

(51) Int. Cl.
*H04M 3/493* (2006.01)
*H04M 7/00* (2006.01)

(52) U.S. Cl.
CPC ......... *H04M 3/493* (2013.01); *H04M 7/0057* (2013.01)

(58) Field of Classification Search
None
See application file for complete search history.

(56) References Cited

U.S. PATENT DOCUMENTS

| | | | |
|---|---|---|---|
| 6,775,378 B1 | 8/2004 | Villena et al. | |
| 8,811,597 B1 | 8/2014 | Hackbarth et al. | |
| 8,942,683 B2 | 1/2015 | Doerr et al. | |
| 10,129,407 B1 | 11/2018 | Haggerty et al. | |
| 10,154,138 B2 | 12/2018 | te Booij et al. | |
| 11,556,880 B1 * | 1/2023 | Li | H04M 3/5175 |
| 12,335,439 B1 * | 6/2025 | Taylor | H04M 3/51 |
| 2019/0325773 A1 * | 10/2019 | Cho | G09B 5/12 |
| 2020/0076947 A1 | 3/2020 | Deole | |
| 2023/0156125 A1 * | 5/2023 | Agarwal | H04M 3/58 379/212.01 |
| 2024/0040346 A1 * | 2/2024 | Beaver | H04W 4/16 |

* cited by examiner

*Primary Examiner* — Quynh H Nguyen
(74) *Attorney, Agent, or Firm* — Young Basile Hanlon & MacFarlane, P.C.

(57) ABSTRACT

A user of a user device initiates a contact center engagement with a first contact center. One or more components of the first contact center processes a prompt obtained from the user device to determine the subject of the contact center engagement and whether the subject of the contact center engagement is related to the first contact center. Based upon a determination that the subject of the contact center engagement is unrelated to the first contact center, a connection is opened to a second contact center to enable the second contact center to address the contact center engagement and the user of the user device. A response may be received at the first contact center from the second contact center, for example, from an agent of the second contact center. The response may then be used to train an artificial intelligence agent of the first contact center.

20 Claims, 8 Drawing Sheets

CONNECTING A USER OF A FIRST CONTACT CENTER TO A SECOND CONTACT CENTER

FIELD

This disclosure relates to a contact center system, and, more particularly, to a system that connects a user of a first contact center to a second contact center, such as to facilitate a contact center engagement between the user and the second contact center using the first contact center.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
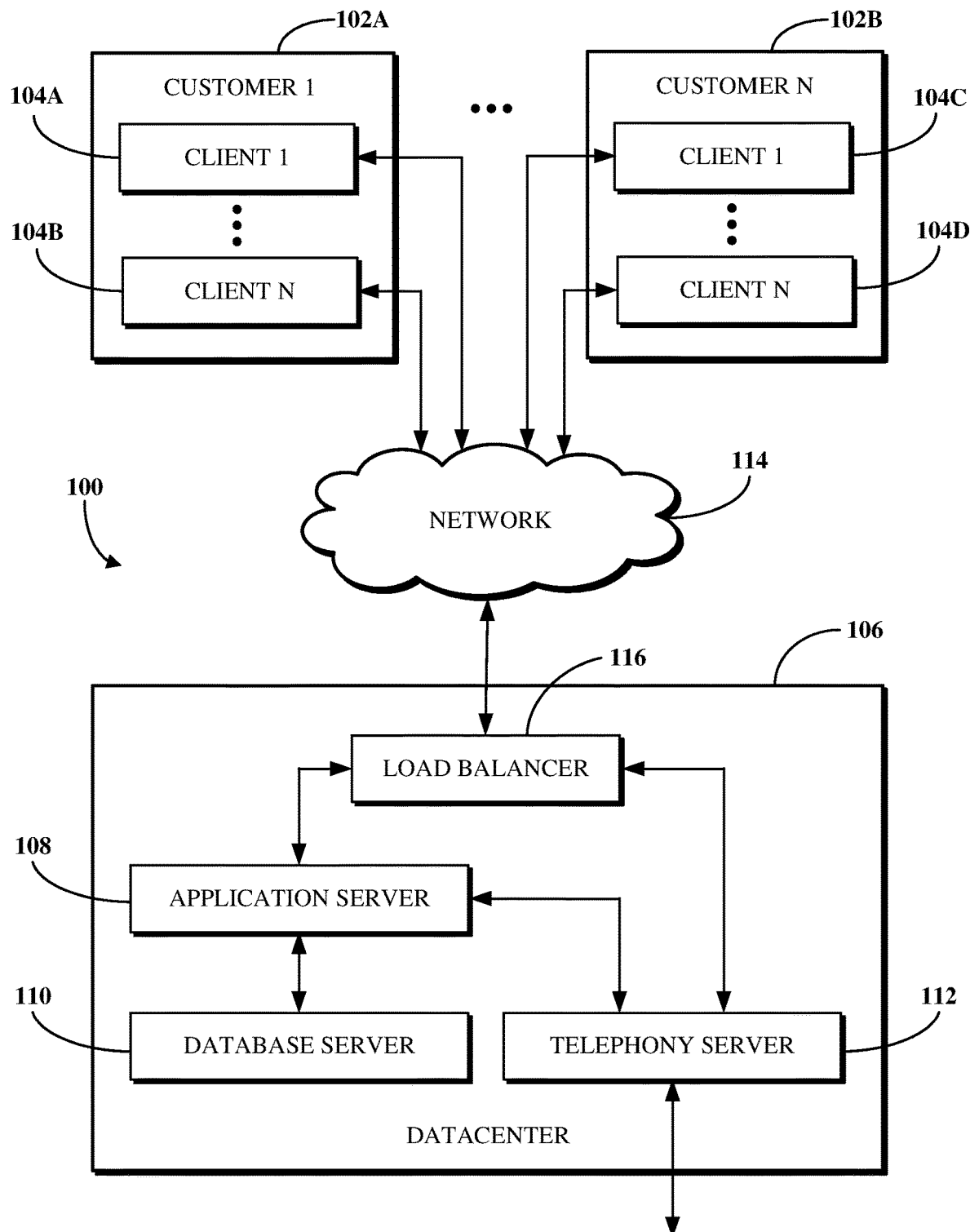
FIG. 1 is a block diagram of an example of an electronic computing and communications system.

The use of contact centers by or for service providers is becoming increasingly common to address customer support requests over various modalities, including telephony, video, text messaging, chat, and social media. A contact center service enables a contact center user to initiate a contact center engagement with a contact center agent to address one or more topics, for example, technical support, account maintenance, or billing inquiries. For example, a contact center engagement can utilize a video conference between an agent of the contact center and a user of the contact center to provide user services such as customer support, customer service, sales services, and the like. A contact center may be implemented by an operator of a software platform, such as a unified communications as a service (UCaaS) or contact center as a service (CCaaS) platform, for a customer of the operator. Users of the customer may thus engage with the contact center to address support requests over one or more communication modalities enabled for use with the contact center by the software platform. Alternatively, the operator of such a software platform may implement a contact center to address customer support requests related to the software platform itself.

In some cases, the subject of a contact center engagement may be related to a product and/or service associated with multiple entities. For example, a user of a conference room which utilizes hardware from a first entity and software from a second entity may need help to troubleshoot use of the hardware and/or the software. In these situations, the user may pick the contact center associated with the entity which they believe is most relevant to the particular issue the user is experiencing. Alternatively, the user may simply be unaware that there are multiple entities involved in the setup of their conference room service. In either case, the user may unintentionally initiate a contact center engagement with a contact center associated with the wrong entity (e.g., the entity which is incapable of addressing the root cause of the subject of the contact center engagement). However, because contact center services are discrete software instances each configured, for security and operational purposes, for use with a single entity, conventional contact center services are designed without a mechanism to transfer a contact center user from a first contact center (i.e., associated with a first entity) to a second contact center (i.e., associated with a second entity) during an engagement.

As such, when a contact center agent operating on behalf of a first entity under such conventional approaches determines that the subject of a current engagement is not something which can be addressed by the first entity, the contact center agent has very limited capability to help the user. For example, the agent must either leave the subject entirely unresolved, provide some identifying information for an entity that should address the subject (e.g., a name, telephone number, and/or website address), or create a new service ticket for themselves to initiate a separate contact center engagement with a service of the second entity on behalf of the user. In any such case, a separate contact center engagement is ultimately required for the subject to be addressed. Thus, the technical limitations resulting from the design choices of conventional contact center services impose a burden on contact center users.

In one example illustrating problems such as these, a user may initiate a contact center engagement with a first entity by submitting, to a contact center of the first entity, a prompt that is related to another entity. For example, a contact center user may, via a client or web application running on their user device, access a contact center of a software company with a prompt, for example, provided as audio over a telephony modality or as text over a chat modality. However, a processing of the prompt may indicate that the subject of the prompt, and thus the subject of the contact center engagement, is to be addressed by the manufacturer of the hardware which runs the software developed by the software company. In these cases, a human or artificial intelligence-based contact center agent of the software company, as the first entity, might refer the user to the contact center of the hardware manufacturer, as the second entity, causing the user to initiate an additional contact center engagement with the second entity. The first entity may reach out to the second entity before the user is merged into the conversation so that the user is not required to repeat information previously provided to the first entity. Thus, and as described above, a more user-friendly technique for addressing contact center engagements that are initially submitted to an incorrect entity may be desirable.

Implementations of this disclosure address problems such as these by enabling seamless connection of two contact center services. The first contact center may connect with the second contact center seamlessly. The first contact center may integrate the second contact center into the first contact center screen, chat box, graphical user interface (GUI), or a combination thereof. The first contact center may integrate a second contact center into communication with the user so that the user does not need to disconnect and open a new session with the second contact center. The second contact center may appear to be part of the first contact center once the second contact center in integrated into the first contact center. Software may merge the first contact center and the second contact center into a single screen, a single chat box, a single GUI, or a combination thereof. For example, the first contact center may include a computer agent that performs an initial triage with the user. The computer agent may determine if a human agent is required or if the discussion with the user is related to another entity.

The software may request permission to merge, consolidate, open, or a combination thereof a unified service area so that the user, the first contact center, and the second contact center may all communication without the user having to establish a new connection or being transferred. The software may monitor the problem experienced by the user and a solution to the problem provided by the first contact center, the second contact center, or both.

The software may be capable of learning solutions to specific problems, for example, using machine learning. The software may use online learning techniques. The online learning techniques may collect all of the solutions provided, the successful outcomes, the unsuccessful outcomes, additional questions asked to the user, or a combination thereof. The online learning techniques may categorize data based upon overlapping questions in a prompt, similar words of questions of a prompt, or both. The online learning techniques may be based upon successful outcomes, unsuccessful outcomes, or both. Based upon this learning the software may be trained to provide feedback regarding responses provided by a human agent or a second entity. The software may propose a solution when a user contacts the first contact center while the user is waiting for a contact center agent. The software may present different solutions to the user without contacting a contact center agent. The software may bypass the first contact center if the software recognizes that the first contact center has not solved the problem in the past.

To describe some implementations in greater detail, reference is first made to examples of hardware and software structures used to implement a system that connects a user of a first contact center to a second contact center. FIG. 1 is a block diagram of an example of an electronic computing and communications system 100, which can be or include a distributed computing system (e.g., a client-server computing system), a cloud computing system, a clustered computing system, or the like.

Implementations of this disclosure address problems such as these by automatically connecting a user accessing a first contact center to a contact center agent from a second contact center in response to determining that the user's prompt is to be addressed by the second contact center. According to some implementations, a first contact center software service (e.g., a contact center server or software running on the server) receives a prompt from a contact center user device. For example, a user of the contact center user device may access the first contact center software service associated with a video conferencing software developer. When prompted to specify a reason for the contact center engagement, the user may specify that the video camera is not working. The first contact center software service determines, based on the prompt and/or other data associated with the contact center user device (e.g., usage logs of the video conferencing software that are accessible to the first contact center software service) that the prompt is to be addressed by a second contact center software service (e.g., the contact center software service of the video conferencing hardware manufacturer). The first contact center software service connects to a human or artificial intelligence-based contact center agent of the second contact center in response to this determination. The contact center agent provides a response to the prompt to the user device and to the first contact center software service. The first contact center software service trains an agent of the first contact center software service based on the response, such that the first contact center software service may be able to automatically respond to similar prompts in the future.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
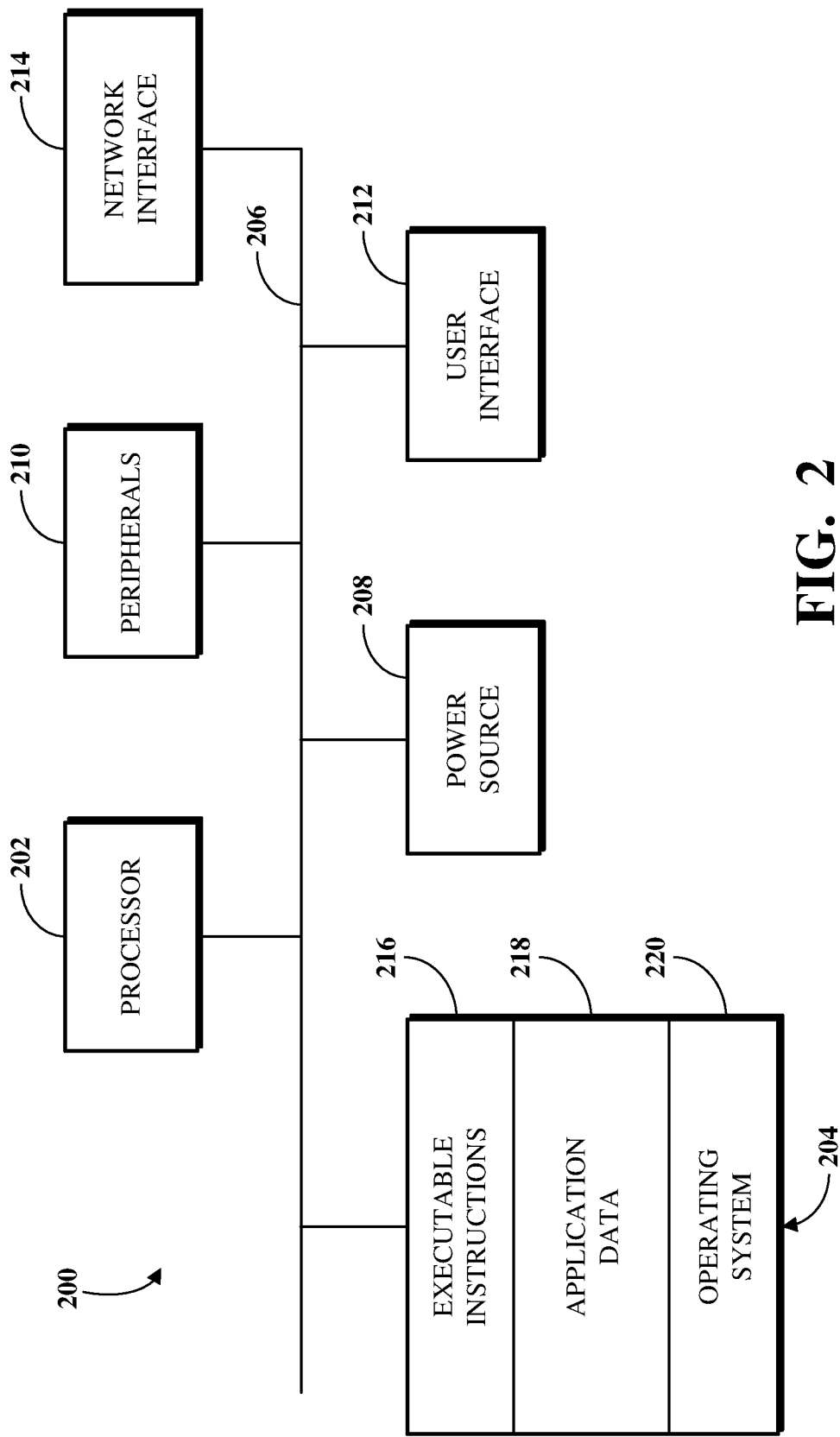
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
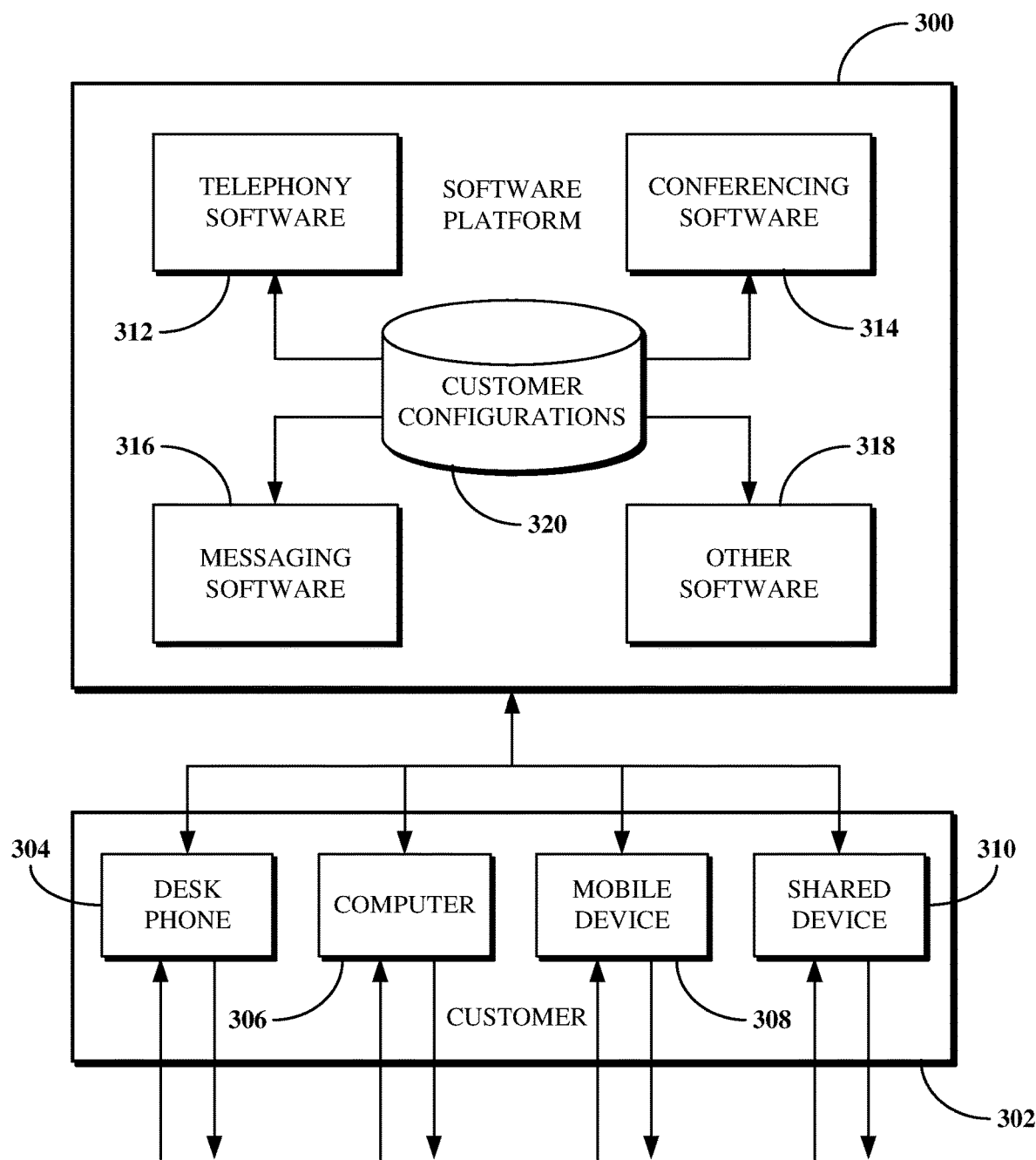
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants (e.g., users), such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can be software that enables seamless connection of contact center engagements between unrelated contact center services, for example, to connect a user of a first contact center to a second contact center. The other software 318 may, in at least some such cases, train a software agent used by a contact center based on a solution and/or response determined by the second contact center, the first contact center, a human agent, or a combination thereof.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
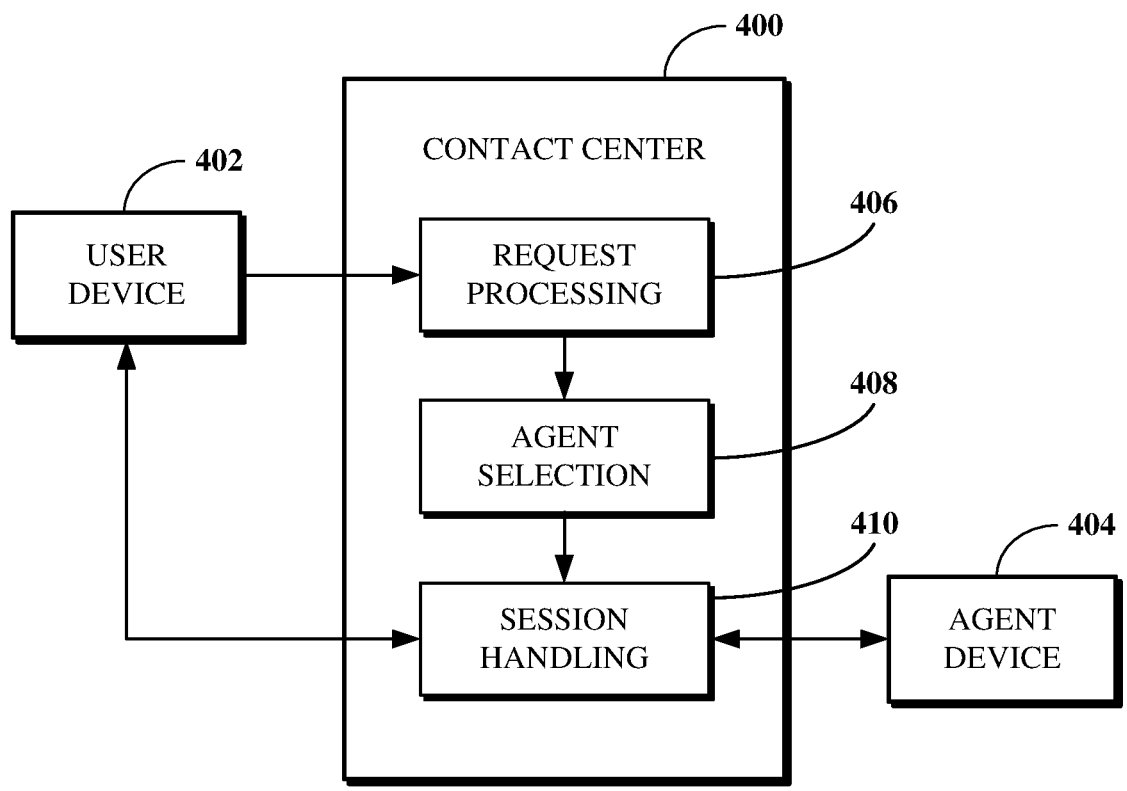
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an interactive voice response (IVR) menu to prompt the user of the user device to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request via text and thereafter process the text entered by the user device 402 using natural language processing and/or other processing.

The agent selection software 408 uses output of the request processing software 406 including the information associated with the request to select a contact center agent to handle the request. The contact center agent may be a human agent or a non-human agent, for example, a chat bot or other bot. The agent selection software 408 may first determine an agent group associated with the category or sub-category of the purpose of the request (e.g., based on the information associated with the request). The agent selection software 408 may thereafter select an agent from that agent group based on one or more criteria, including agent skill set, agent availability, an agent selection policy (e.g., indicating to rotate in a particular way through a list of available agents), agent review scores, a combination thereof, or the like.

Generally, an agent may belong to one agent group and be able to facilitate requests over one modality. For example, a contact center agent may only be part of an agent group that handles information technology-related requests over the telephony modality. However, in some cases, a given agent may belong to multiple agent groups and/or be able to facilitate requests over one or more modalities. For example, a contact center agent may be part of a first agent group that handles accounting-related requests over all of the telephony, video, chat, text, and social media modalities. In another example, a contact center agent may be part of a first agent group that handles accounting requests over the telephony modality and part of a second agent group that handles information technology-related requests over the video modality. Generally, the agent selected by the agent selection software 408 will automatically be assigned the contact center engagement with the user device 402. However, in some implementations, the agent selection software 408 instead may prompt the selected agent to accept the contact center engagement with the user device 402 before assigning that contact center engagement to the selected agent.

The session handling software 410 establishes a connection for a session between the user device 402 and the agent device 404, which is the device of the agent selected by the agent selection software 408. The particular manner of the connection and the process for establishing the connection may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software. The session handling software 410 may facilitate a contact center engagement including by determining a sentiment-based score for the engagement and alerting a contact center operator, such as an agent or supervisor, regarding the sentiment-based score or a prioritization thereof based on the score meeting or exceeding a threshold.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

Figure 5:
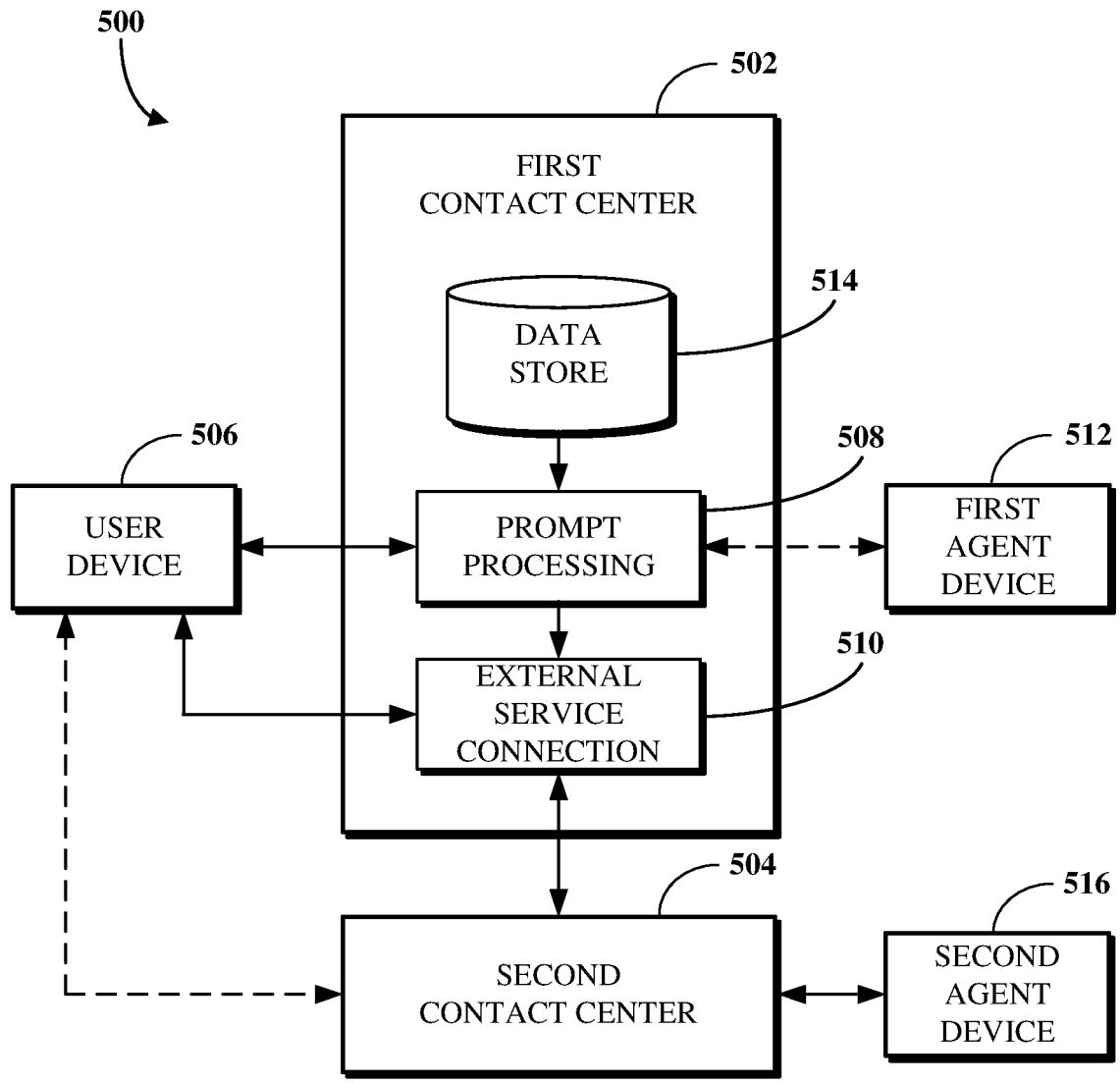
FIG. 5 is a block diagram of a first example of a system for connecting a user of a first contact center a second contact center.

FIG. 5 is a block diagram of a first example of a system 500 for connecting a user of a first contact center 502 (also referred to herein as a first contact center software service) to a second contact center 504 (also referred to herein as a second contact center software service). The first contact center 502, which may, for example, be the contact center 400 shown in FIG. 4, is associated with a first entity. The second contact center 502, which may also be like the contact center 400, is associated with a second entity. The user of the first contact center 502 accesses the first contact center 502 via a user device 506 (also referred to herein as a contact center user device), which may, for example, be one of the clients 304 through 310 shown in FIG. 3 or another client or non-client device. For example, the user device 506 may run a client application or a web application that connects the user device 506 to one or more servers used to implement the first contact center 502. In another example, the user device 506 may run a software application usable to communicate with the one or more servers over one or more modalities, such as a text messaging or email application installed on a smartphone.

The system 500 uses software, including prompt processing software 508 and external service connection software 510, to connect the user of the user device 504 from the first contact center 502 to the second contact center 504. The software 506 and 508 may be run on one or more servers used to implement or otherwise associated with the first contact center 502. In some cases, a portion of the software may run on the user device 504 and another portion thereof may run on a server, or some other device that may be used in connection with the first contact center 502. The system 500 may connect the user through the user device 506 to the first contact center 502 on or in communication with a contact center agent using a first agent device 512. In some cases, the first contact center 502 may place the user of the user device 506 in an automated queue. The automated queue may identify users of the first contact center 502 to be connected to the second contact center 504. The first contact center 502 and the user device 506 may be in communication over the internet or another network, telephony, or another real-time or non-real-time communication means or protocol.

After the user device 506 initiates a request for a contact center engagement with the first contact center 502 (e.g., by initiating a telephone call to a telephone number associated with the first contact center 502 or transmitting a request for a video conference to a uniform resource locator associated with the first contact center 502 or via a client application), a prompt representing the subject of the contact center engagement is received from the user device 506. For example, the prompt may be received from the user device 506 via one or more IVR menu option selections made at the user device 506, as speech captured within audio from the user device 506, or as text entered within a chat window opened for the contact center engagement (e.g., via a chat box, a GUI, or other text dialogue element that enables communication between the first contact center 502 and the user device 504). The prompt processing software 508 processes the prompt received from the user device 506 to determine the subject of the contact center engagement and to determine whether the subject of the contact center engagement is capable of being addressed by the first contact center 502. Thus, if the prompt processing software 508 determines that the subject of the contact center engagement is not related to the first contact center 502, the first contact center 502 requires additional support, or both, the output of the prompt processing software 508 may indicate for the first contact center 502 to connect the user device with the second contact center 504.

In particular, the prompt processing software 508 processes the prompt received from the user device 506 using an intent matching engine that matches the prompt to an intent. The intent may, for example, be or otherwise correspond to one or more of a company name, a product name, a service name, an issue with a company, an issue with a product, or an issue with a service. The intent matching engine may be implemented using machine learning or other artificial intelligence technologies. In some examples, the intent matching engine may leverage a convolutional neural network (CNN). Alternatively, any other type of artificial neural network (ANN) may be used. In some cases, the intent matching engine may be implemented using at least one of a classification model, a regression model, clustering, dimensionality reduction, or deep learning. The intent matching engine uses natural language processing (NLP) to evaluate natural language of the prompt typed or spoken in one or more languages against intents recognizable to the prompt processing software 508. For example, the prompt processing software 508 may access a data store 514 which stores data associated with intents. In some such cases, the data may be associated only with intents corresponding to the first contact center 502. For example, the prompt processing software 508 can determine that the subject of the contact center engagement is not related to the first contact center 502 where an intent matching the prompt is not found in the data store 514. In other such cases, the data may be associated with intents corresponding to the first contact center 502 and to one or more other contact centers, such as the second contact center 504. For example, the prompt processing software 508 can determine that the subject of the contact center engagement is not related to the first contact center 502 where an intent matching the prompt is represented by data that corresponds to a contact center other than the first contact center 502. In some cases, the data stored in the data store 514 and used to evaluate the prompt may correspond to account information associated with the user of the user 506, for example, in addition to or instead of data associated with the prompt itself (e.g., data associated with the intent matching the prompt). The intent matching engine may in some cases uses a series of questions to evaluate the prompt, in which case the prompt may be understood to include information obtained from the user device 506 in response to an initial inquiry from the first contact center 502 and/or one or more of those questions.

The second contact center 508 is associated with a second entity that is separate (i.e., different) from a first entity that is associated with the first contact center 502. Thus, the second contact center 504 is not natively connected to the first contact center 502, and vice versa. The external service connection software 510 automates a connection involving the second contact center 504 based on a determination (e.g., by the prompt processing software 508) that the subject of the contact center engagement is unrelated to the first contact center 502. The external service connection software 510 can automate the connection using an application programming interface (API) of the second contact center 504, for example, where the API is exposed publicly or otherwise for use by the first contact center 502. Alternatively, the external service connection software 510 can automate the connection by, without manual user input, initiating a new contact center engagement with the second contact center 504 and relaying the prompt received from the user device 506 to a prompt processing component of the second contact center 504.

The connection established by the external service connection software 510 may operate in one of multiple possible ways. In some cases, the connection may be established directly between the first contact center 502 and the second contact center 504. Thus, in such a case, the first contact center 502 and the second contact center 508 may, based on a connection established using the external service connection software 510, directly communicate without the user device 504 being directly connected to the second contact center 508. Instead, the user device 506 may further the contact center engagement by interfacing with the first contact center 502 via the external service connection software 510, which can serve as an intermediary between the user device 506 and the second contact center 504 without the user device 506 directly connecting to the second contact center 504. In other cases, as shown by the dashed line in FIG. 5, the connection may be established directly between the user device 506 and the second contact center 506, in which case the first contact center 502 may cease to be involved in the contact center engagement once the external service connection software 510 causes the direct connection between the user device 506 and the second contact center 504 to occur.

As the first contact center 502 has agents operating on its behalf to handle contact center engagements, such as an agent operating or being operated by the first agent device 512, the second contact center 502, too, has such agents. For example, as shown, a second agent device 516 is used by or for an agent of the second contact center 504. An agent at the first contact center 502, the second contact center 508, or both may be a computer agent, a human agent, or both. In some implementations, the prompt processing software 508 may operate merely to direct the contact center engagement to an agent of the first contact center 502 (e.g., to the first agent device 512). For example, once an agent operating or being operated by the first agent device 512 determines that the user has a problem that requires the second contact center 508, the agent device 512 may indicate (e.g., to the prompt processing software 508) to connect the user device 506 (e.g., via the external service connection software 510) to the second contact center 508 to enable an agent of the second contact center 508 (e.g., via the second agent device 516) to address the subject of the contact center engagement. For example, the agent device 512 or another component associated with the first contact center 502 may provide information regarding the reason the user of the user device 506 contacted the first contact center 502 so that, once the second contact center 508 (e.g., via the second agent device 516) is in communication with the user device 504, the second contact center 508 may be able to assist the user without the user having to reiterate reasons for contacting the first contact center 502. In at least some cases, the first contact center 502 (e.g., via the external service connection software 510) merges the second contact center 504 into a single screen, chat box, GUI, or a combination thereof used with the existing contact center engagement between the user device 506 and the first contact center 502 so that the second entity associated with the second contact center 504 is added seamlessly to the existing contact center engagement.

An artificial intelligence agent of the first contact center 502 (e.g., the agent operated by the first agent device 512, in at least some cases) may be trained, for example, using online learning techniques, based on information obtained from the second contact center 504 in connection with the handling of the contact center engagement by the second contact center 504. For example, a response to the prompt can be obtained by the first contact center 502 from the second contact center 504 (e.g., via a merged screen, chat box, GUI, or the like with the first contact center 502) and used to train the agent of the first contact center 502. In some cases, the training may be to enable the agent of the first contact center 502 to process similar such prompts in the future. In other cases, the training may be to enable the agent of the first contact center 502 to more expeditiously process similar such prompts by forwarding them to the second contact center 504. In the case that the second contact center 504 is also unrelated to the subject of the contact center engagement, the artificial intelligence agent may be trained to prevent similar such prompts from being addressed by the second contact center 504 in the future.

In some implementations, and as eluded to above, the user of the user device 506 may be placed in an automated queue associated with the first contact center 502 to prepare the user device 506 to be connected to the second contact center 504. For example, the prompt processing software 508, upon determining on its own or based on input obtained from the first agent device 512 that the subject of the contact center engagement associated with the user device 506 is unrelated to the first contact center 502, may determine that the subject of the contact center engagement is instead associated with the second contact center 504. The prompt processing software 508 may accordingly enqueue the user device 506 within an automated queue configured for connecting enqueued parties to the second contact center 504. Parties may be connected to the second contact center 504 via the queue based, for example, upon resource availability at the second contact center 504 or on a discrete time interval basis (e.g., once per ten seconds). In some such implementations, a single automated queue may be used by the first contact center 502 for all other contact centers, in which case an entry within the automated queue may be tagged with information identifying the other contact center (e.g., the second contact center 504) to which to connect a subject party. In other such implementations, different automated queues may be sued by the first contact center 502 for each other contact center to which a connection may be established.

Figure 6:
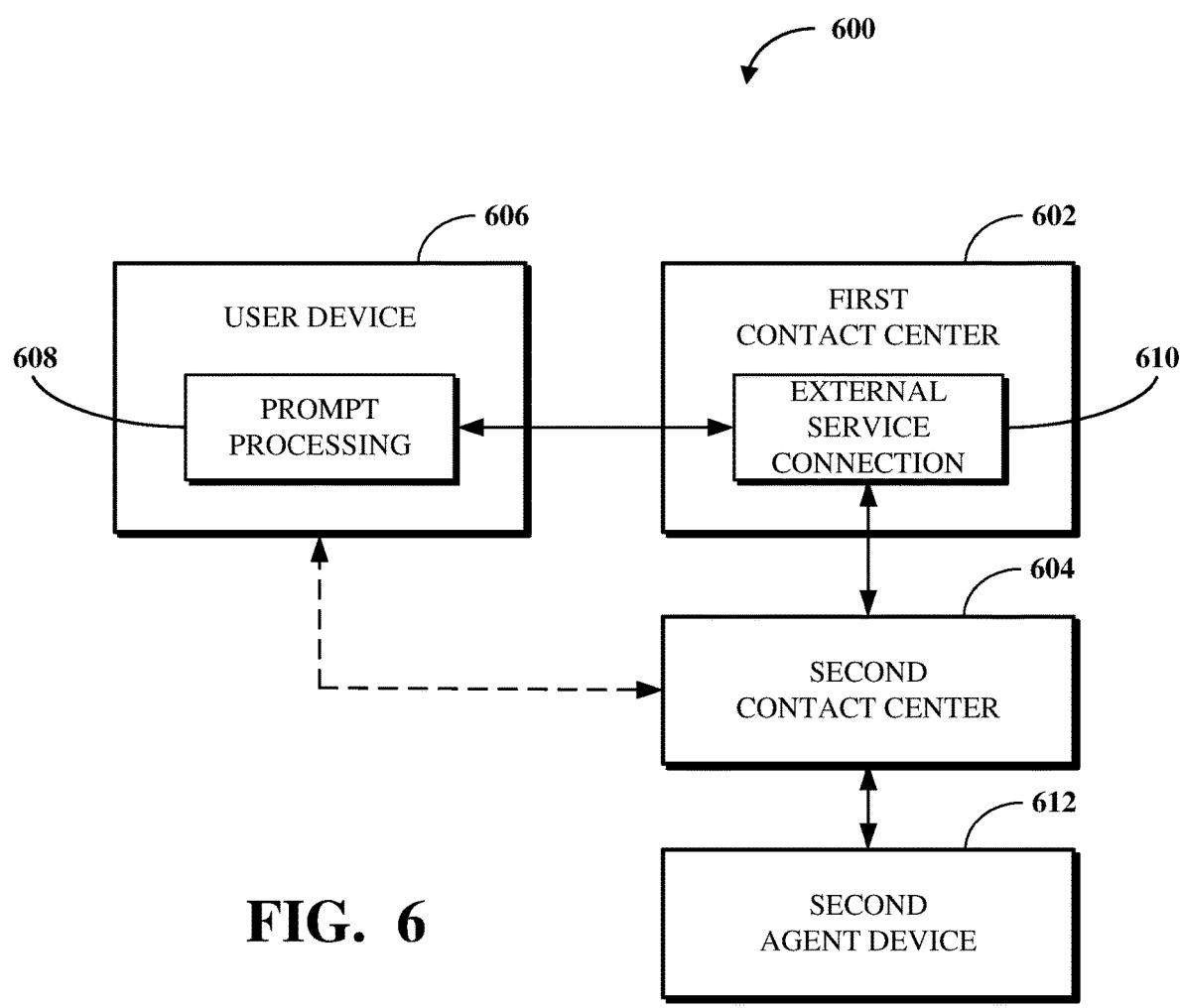
FIG. 6 is a second example of a system for connecting a user of a first contact center to a second contact center.

FIG. 6 is a second example of a system 600 for connecting a user of a first contact center 602 to a second contact center 604. For example, the first contact center 602 may be like the first contact center 502 shown in FIG. 5, and the second contact center 604 may be like the second contact center 504 shown in FIG. 5. Similar to as described with respect to FIG. 5, a user device 606, which may be like the user device 506 shown in FIG. 5, initiates a contact center engagement with the first contact center 602. However, whereas a prompt associated with the contact center engagement is processed at the first contact center 502 in the system 500 shown in FIG. 5, in the system 600, prompt processing software 608 for processing the prompt runs at the user device 606. For example, the prompt processing software 608 may be included within a client or web application running at or via the user device 606 and used in connection with the contact center engagement. The prompt processing software 608 may, for example, be like the prompt processing software 508 shown in FIG. 5 and thus process the prompt at the user device 606 in the manner similar to described with respect to FIG. 5.

Upon a determination, via the prompt processing software 608, that a subject of the contact center engagement is unrelated to the first contact center, external service connection software 610 at the first contact center 602 initiates a connection to the second contact center 604. For example, the external service connection software 610 may be like the external service connection software 510 shown in FIG. 5 and thus operate as described in connection therewith to establish a connection involving the second contact center 604. For example, the external service connection software 610 may enable a connection between the user device 606 and the second contact center 604 with the first contact center 602 serving as an intermediary. In another example, the external service connection software 610 may enable a direct connection between the user device 606 and the second contact center 610, as shown by the dashed lines. Ultimately, an agent device 612 associated with the second contact center can handle the contact center engagement.

In an example use case to illustrate the processing described with respect to FIGS. 5 and 6, a contact center user, using a user device, may initiate a contact center engagement with a first contact center associated with an entity which develops and operates video conferencing software. The user may be experiencing an issue with their monitor used for video conferencing services within a conference room. The user may, via a chat box instantiated for the text-based contact center engagement, type a prompt indicating that they are having trouble getting their monitor to turn on. The prompt may be processed at or otherwise in connection with the first contact center to determine that the prompt does not concern the use of the video conferencing services made available by the entity with which the first contact center is associated. Thus, in response to the prompt, the first contact center may indicate within the chat box that the prompt appears to be related to issues with the user's monitor rather than the video conferencing service with which the monitor may be used. The first contact center may indicate that they will be connecting the user to a second contact center associated with an entity which manufactures display hardware (e.g., televisions and/or monitors), and, specifically, the brand of monitor used by the user. The first contact center establishes a connection with the second contact center and merges an agent of the second contact center, via text, within the existing chat box already in use with the contact center engagement. A response to the prompt by the second contact center is then used to train an artificial intelligence agent of the first contact center.

To further describe some implementations in greater detail, reference is next made to examples of techniques which may be performed by or using a method and device to connect a participant with a first contact center and a second contact center. FIG. 6 is a flowchart of an example of a technique 600 for connecting a user with an appropriate contact center if the first contact center is not able to rectify the prompt (e.g., solve the problem or remove a barrier). The technique 600 can be executed using computing devices, such as the systems, hardware, and software described with respect to FIGS. 1-5B. The technique 600 can be performed, for example, by executing a machine-readable program or other computer-executable instructions, such as routines, instructions, programs, or other code. The steps, or operations, of the technique 600 or another technique, method, process, or algorithm described in connection with the implementations disclosed herein can be implemented directly in hardware, firmware, software executed by hardware, circuitry, or a combination thereof.

The technique 600 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The technique 600 taught herein may have a device (e.g., a first contact center software service) that receives 602 a prompt from a contact center user device. The contact from the contact center user device may be initiated by a user prompting (e.g., initiating a contact center engagement with) the contact center. The contact initiated through the contact center user device may be prompted 602 by the user via a first contact center software service. The first contact center contact surface may be that of a first entity, belong to the first entity, controlled by the first entity, part of an application, part of a web-based program, or a combination thereof. The prompt 602 may be initiated by the user. The prompt 602 may open communication between the first entity and the user. The prompt 602 may open a screen, chat, chat box, GUI, verbal communication, written communication, web-based dialogue, or a combination thereof. The prompt 602 may initially open communication with a computer agent (e.g., artificial intelligence agent) of the first entity. The prompt 602 may open communications where more information is requested. During the prompt 602, the computer agent may offer suggestions to solve a problem. The computer agent during the prompt 602 may perform a triage 604 to determine if a suggestion may be provided, if a live agent is needed, if a third-party is needed to provide a solution, or a combination thereof.

The triage 604 may be the computer agent reviewing terminology provided by the user, searching a database of the first contact center, reviewing the answers, or a combination thereof. The triage 604 may performed based on comparing the answers, terms, or both with services and/or programs provided by the first contact center. For example, if the first contact center relates to software and the questions relate to hardware when the triage 604 may reveal that the problem most likely relates hardware that is not related to the first contact center.

The first contact center software service may determine 606 how to resolve the reason for the prompt 602 based upon the triage 604. The first contact center software (e.g., computer agent) may search stored data to determine 606 a way to address the prompt 602. The stored data may be logged data, historical data associated with the prompts 602, usage of data of an electronic device, data about the account stored by the first contact center software service, or a combination thereof. The determination 606 may be made based on stored data, prior responses, known capabilities, known subject matter, software, or a combination thereof. If the determination 606 is that the content relates to the first entity then the first contact center software service may attempt to solve the problem or pass the user to a live technician. The determination 606 may be based on a determination that the prompt 602 relates to a product or a service associated with a second entity. If the determination 606 indicates that the prompt 602 is related to a third-party then the first contact center may connect 608 with the third-party. The determination 606 may indicate that the computer agent (e.g., artificial intelligence agent) of the first contact center software service is unable to adequately address the reason for the prompt 602. The computer agent may base the determination 606 based on speech or text of the prompt 602, a relationship to a product or a service, relating the product or service to a second entity, stored data, or a combination thereof.

The connection 608 with the third-party may occur directly between the first contact center and a second contact center (e.g., a service center of the third-party (i.e., a second entity)). The connection 608 may be between the first contact center and a partner, the first contact center and a non-partner, a first contact center and another entity, or a combination thereof. The connection 608 may connect the first contact center to the second contact center before the second contact center is connected to the user or before the second contact center is brought into the established connection with user. The connection 608 may directly connect the second contact center within the first contact center. Thus, for example, the third-party may be integrated into the first contact center by the first contact center software service so that the user does not have to contact the third-party directly, disconnect, reconnect, or a combination thereof. The connection 608 may first have an indirect communication between the first entity and the second entity (e.g., third-party) before the user is included in the communication. The connection 608 may directly connect the first entity, the second entity, and the user simultaneously so that seamless troubleshooting may occur. The first entity may connect 608 the second entity without any action from the user other than the initial prompt 602. Once the first entity forms a connection 608 with the second entity and the user, then a response 610 may be received by the user.

The response 610 may be instructions from a second contact center software service (e.g., a second computer agent). The response 610 may be provided by a contact center agent. The response 610 may be instructions to the user where the user is requested to perform some action. The response 610 may be requesting control. For example, the second contact center software service may request to manipulate a user device. The response 610 may assist in correcting some functionality or some issue related to the prompt 602. The response 610 may solve the prompt 602. For example, the user is able to use the program or device as intended or the user's question is resolved. During the response 610 the first contact center software service is collecting data and training 612 regarding that particular prompt.

The training 612 may be a collection of data by a computer agent. The training 612 may be the computer agent categorizing data based on suggestions, solutions or both provided by the first contact center, the second contact center, or both. The training 612 may store data regarding suggestions that resulted in a prompt being resolved, continued questioning, attempts to solve the prompt, or a combination thereof. The training 612 may collect data until a sufficient amount of data is collected, a predetermined amount of data is collected, or both. The training 612 may use online learning techniques, artificial intelligence learning, interaction with a human agent, instructions from humans, or a combination thereof. For example, the predetermined amount of data may be the first contact center, the second contact center, or both providing a predetermined answer a number of times or more. The number of times may be about 10 or more, 15 or more, or 20 or more instances where an answer is provided to a prompt.

Once a predetermined number of instances are collected the computer agent may provide suggestions to the user before contacting a second contact center. The computer agent may continue to train 612 regarding other prompts 602 where a predetermined number of instances have not been encountered. Thus, for example, the computer agent may suggest solutions to later prompts 602 that relate the third-party without interaction with the third-party when a predetermined number of instances have been collected. The training 612 may assist a user without need for the second contact center.

Figure 7:
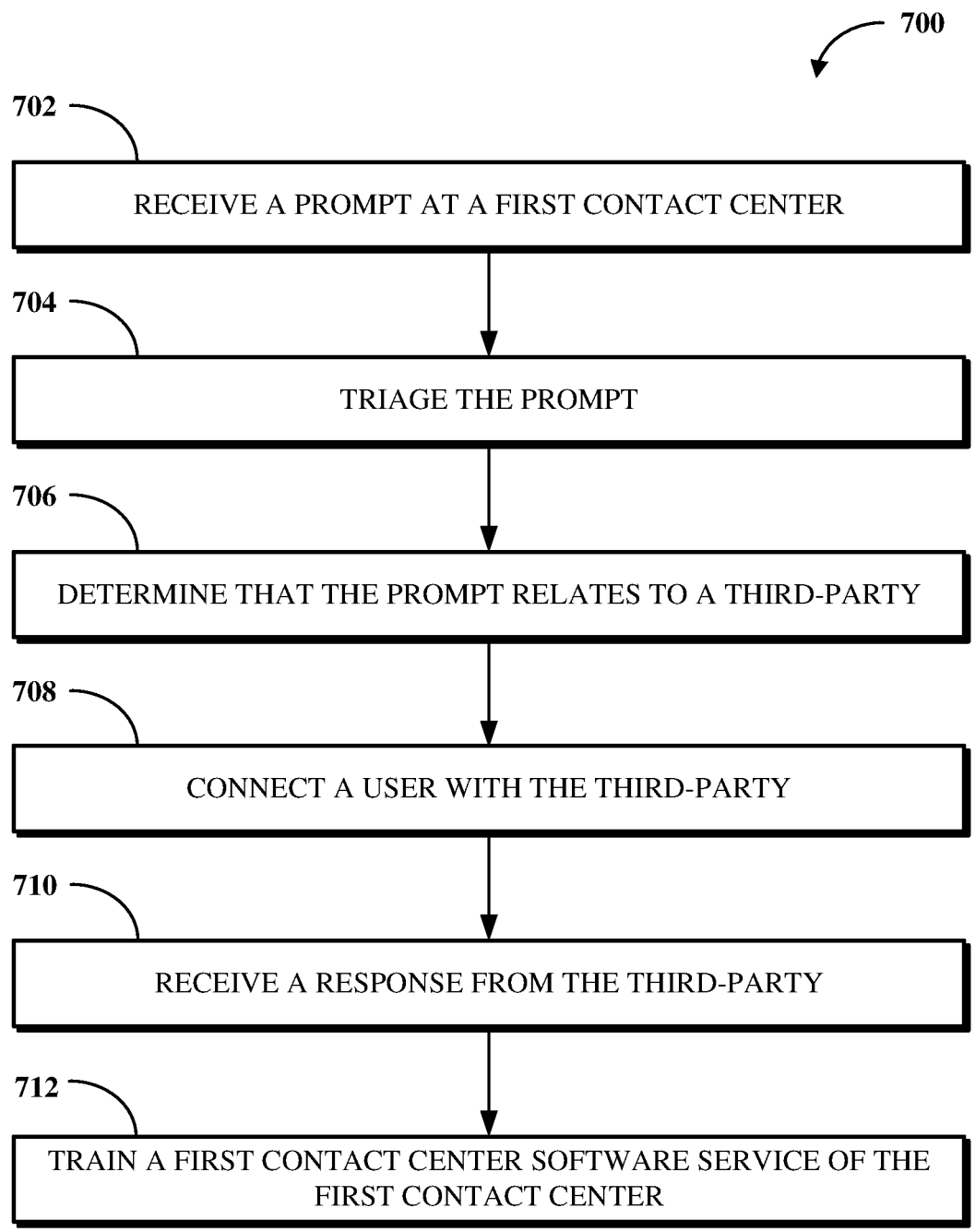
FIG. 7 is a flowchart of an example of a technique for connecting a user of a first contact center to a second contact center during an engagement with the first contact center.
Figure 8:
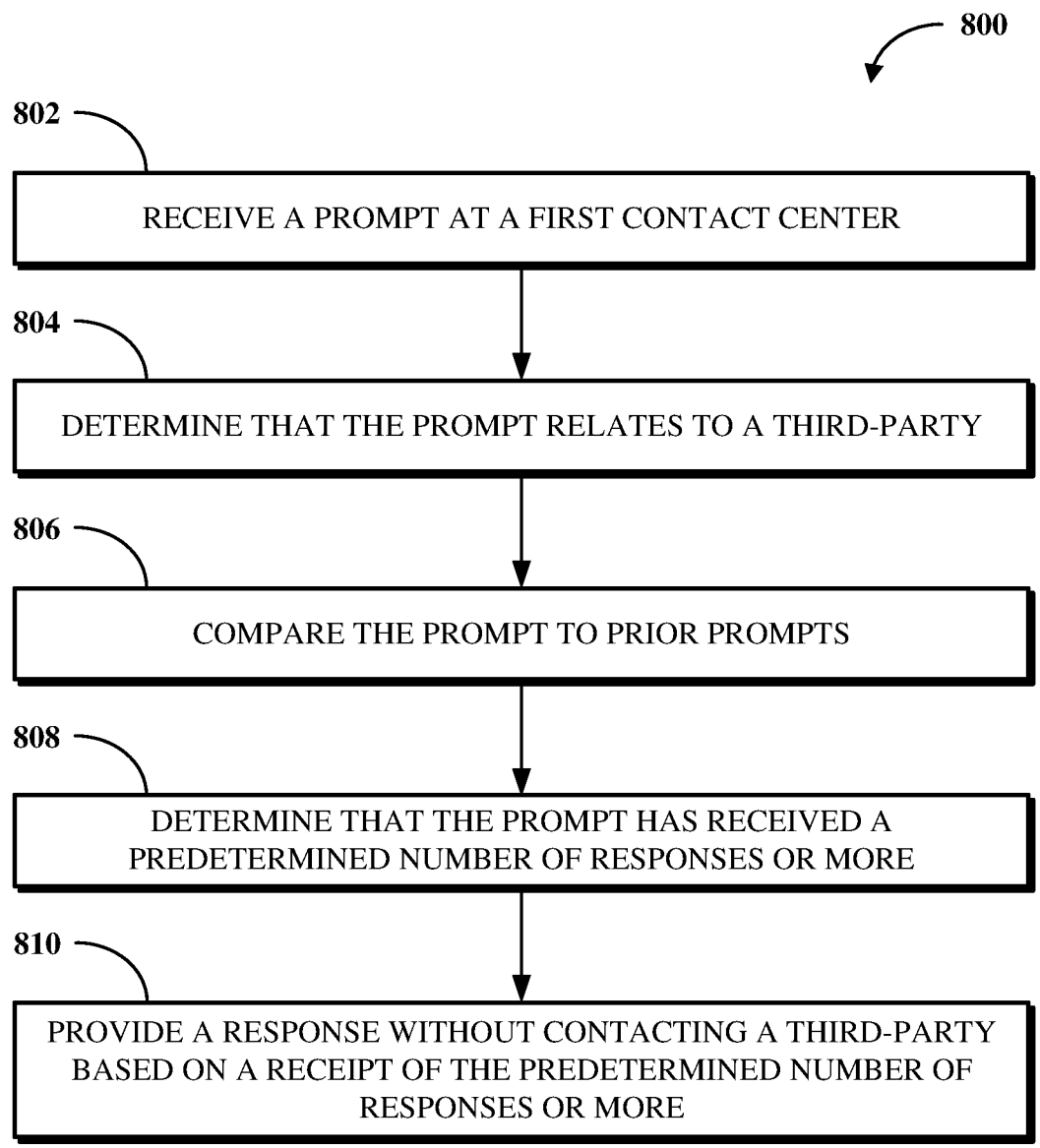
FIG. 8 is a flowchart of an example of a technique for connecting a user of a first contact center to a second contact center based on prior prompts.

To further describe some implementations in greater detail, reference is next made to examples of techniques which may be performed by or using a device and method to connect a participant with a first contact center and resolving an issue based on past communications with a second contact center. FIG. 7 is a flowchart of an example of a technique 700 where the first contact center provides responses that were previously provided by a third-party contact center. The technique 700 can be executed using computing devices, such as the systems, hardware, and software described with respect to FIGS. 1-6. The technique 700 can be performed, for example, by executing a machine-readable program or other computer-executable instructions, such as routines, instructions, programs, or other code. The steps, or operations, of the technique 700 or another technique, method, process, or algorithm described in connection with the implementations disclosed herein can be implemented directly in hardware, firmware, software executed by hardware, circuitry, or a combination thereof.

For simplicity of explanation, the technique 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The technique 700 permits a user to communicate with a first contact center via a prompt 702 via a contact center agent device. The prompt 702 may be a window presented at the user device and that is configured to receive a communication from a user for any of the reasons discussed herein. The prompt 702 may permit a user to request help or to resolve an issue that the user perceives to be related to the first contact center (e.g., first entity). The prompt 702 may permit a user to pose a question that requests help from the first contact center and/or an agent of the first contact center. The first contact center may review the question and/or discussion that propagates the prompt 702 so that an agent may review the prompt 702 and determine 704 that the reason for the prompt 702 relates to a third-party (e.g., a second entity).

The first contact center may have artificial intelligence that performs an initial triage (discussed at 604 in FIG. 6) to determine 704 how best to proceed. The determination 704 may be to provide suggestions, request more information, transfer to a third-party, transfer to a human agent, or a combination thereof. Before a final determination 704 may be made the first contact center may compare 706 the prompt to prior prompts.

If the determination 704 is that the prompt relates to a third-party, the current reason for the prompt 702 may be compared 706 to prior prompts where the third-party resolved the prompt 702. The first contact center, the artificial intelligence, the first contact center software service, or a combination thereof may compare 706 the current reason of the prompt 702 to prior reasons of the prompts and attempt to resolve the prompt 702 before contacting the third-party. In comparing 706 the current prompt 702 to prior prompts the first contact center may provide only suggestions that have resulted in favorable outcomes. Once the artificial intelligence has compared 706 the current reason for the prompt 702 to prior prompts, the artificial intelligence may determine 708 if the prior prompts have been received a predetermined number of responses or more. The predetermined number of responses may be determined by the artificial intelligence as a statistically significant number of responses to a particular question. The predetermined number of responses may be set by a contact center or a human agent. The predetermined number of responses may be 10 or more, 20 or more, or 30 or more before the artificial intelligence attempts to resolve a reason of a prompt 702 without contacting a third party. For example, if the predetermined number of responses have not been met then the artificial intelligence may go directly to the third-party. If, however, a predetermined number of responses have been met then the artificial intelligence may review the prior responses.

The number of predetermined responses may depending on a complexity of the reasons of the response. For example, a question that is determined to be more complex may require a higher number of responses then a less complex question. In another example, if the question is how to increase volume then less responses may be needed then if the question is how to connect to some remote device. The number of predetermined responses may be four or more, six or more, ten or more, twenty or more, thirty or more, or even fifty or more before the artificial intelligence will determine 708 that the predetermined quantity of data is present to attempt to provide an answer. The predetermined responses may only include successful results from the prompt 702. The predetermined responses may include unsuccessful results from the prompt 702. The responses studied and saved may only be responses where the user indicated that the response was successful. However, unsuccessful responses may be saved to train the artificial intelligence as was discussed in 612 of FIG. 6. The responses may be reviewed based on user feedback, system feedback, successful outcomes, or a combination thereof to determine 708 if a predetermined number of responses or more have been provided. The artificial intelligence may only determine 708 that a response regarding a third-party may be provided if a predetermined number of responses or a statistically significant number of responses have been received. The artificial intelligence in comparing 706 may rank the outcomes in order of success so that when determining 708 if a predetermined number of responses have been provided so that the artificial intelligence may have a reasonably likelihood that the response provided will result in a successful outcome. Once the predetermined number of responses are met then the artificial intelligence may provide 710 a suggested course of action to the user without interaction by a third-party.

The provided 710 course of action may be a highest ranked response, a response with the most instances, a response that is provided first by the third-party, or a combination thereof. The provided 710 response may be provided without involving the third-party. The first contact center may provide 710 a resolution to a user without contacting a second contact center or a second contact center software service after a response is provided to a question a predetermined number of times. After a first response is provided 710 the artificial intelligence may query the user whether the prompt 702 was resolved. If the prompt 702 was not resolved by the first response provided 710 then the artificial intelligence may provide 710 a second response. The artificial intelligence may provide 710 five or less, four or less, or three or less responses with unsuccessful results before the artificial intelligence of the first contact center before contacting the second contact center.

A system of one or more computers may be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. The teachings herein include a method. The method includes receiving, by a first contact center software service associated with a first entity, a prompt from a contact center user device. The method includes determining, by the first contact center software service and based on stored data associated with one or more of the prompt or an account of the contact center user device, to address the prompt using a second contact center software service associated with a second entity. The method includes connecting, based on the determination, the first contact center software service and the contact center user device to the second contact center software service. The method also includes receiving, at the first contact center software service, a response to the prompt from the second contact center software service. The method includes training, using online learning techniques, an artificial intelligence agent of the first contact center software service based on the response. The teachings herein may include corresponding computer systems, apparatus, and computer programs recorded on one or more computer storage devices, each configured to perform the actions of the methods.

The teachings may include one or more of the following features. The method where the stored data may include at least one of: logged data or historical data associated with the account, usage data of an electronic device, or data about the account stored at the first contact center software service. The determination to address the prompt using the second contact center software service is based on a determination that the prompt relates to a product or a service associated with the second entity. Determining to address the prompt using the second contact center software service may include: determining that the artificial intelligence agent of the first contact center software service is unable to adequately address the prompt; and determining, using the artificial intelligence agent of the first contact center software service and based on speech or text of the prompt or based on stored data associated with the account, that the prompt is related to a product or a service associated with the second entity, where the second entity is a member of a stored set of entities having products or services for use in conjunction with a product or a service of the first entity. The prompt from the contact center user device is received via a screen, chat box, graphical user interface, or a combination thereof where the first contact center software service communicates with a user of the contact center user device. The first contact center software service merges the second contact center software service of a second entity into a single screen, chat box, graphical user interface, or a combination thereof so that the second entity is added seamlessly to an existing contact center engagement between the contact center user device and the first contact center software service. The artificial intelligence agent of the first contact center software service provides a resolution to a user of the contact center user device without contacting the second contact center software service after a response is provided to a questions a predetermined number of times. The second entity is a partner of the first entity and the second entity is connectable to the first entity in real time via the first contact center software service. Implementations of the described techniques may include hardware, a method or process, or computer software on a computer-accessible medium.

The teachings provide an apparatus that includes a memory. The apparatus also includes a processor configured to execute instructions stored in the memory. The apparatus includes receiving, by a first contact center software service associated with a first entity, a prompt from a contact center user device. The apparatus includes determining, by the first contact center software service and based on stored data associated with one or more of the prompt or an account of the contact center user device, to address the prompt using a second contact center software service associated with a second entity. The apparatus connects, based on the determination, the first contact center software service and the contact center user device to the second contact center software service. The apparatus receives, at the first contact center software service, a response to the prompt from the second contact center software service. The apparatus trains, using online learning techniques, an artificial intelligence agent of the first contact center software service based on the response. The teachings include corresponding computer systems, apparatus, and computer programs recorded on one or more computer storage devices, each configured to perform the actions of the methods.

The teachings may include one or more of the following features. The apparatus where the memory is configured to store the stored data, and where the stored data may include one or more of: logged data, historical data associated with the account, usage data of an electronic device, data about the account stored at the first contact center software service, or a combination thereof. The artificial intelligence agent determines that the prompt relates to a product or service associated with the second entity and determines that the second contact center software service should be connected to address the prompt. The processor executes the instructions stored in the memory to: determine that the artificial intelligence agent of the first contact center software service is unable to adequately address the prompt; and determine, using the artificial intelligence agent of the first contact center software service and based on speech or text of the prompt or based on stored data associated with the account, that the prompt is related to a product or a service associated with the second entity, where the second entity is a member of a stored set of entities having products or services for use in conjunction with a product or a service of the first entity. The first contact center software service, upon receiving the prompt, generates a chat box, screen, graphical user interface, or a combination thereof so that the artificial intelligence agent of the first contact center software service communicated with a user. The second contact center software service is merged with the first contact center software service so that a user is connected with the second contact center software service without changing connections, being disconnected from the first contact center software service, or both. The teachings may include hardware, a method or process, or computer software on a computer-accessible medium.

The present teachings provide a non-transitory computer readable medium storing instructions operable to cause one or more processors to perform operations. The non-transitory computer readable medium storing instructions via the one or more processors receive, by a first contact center software service associated with a first entity, a prompt from a contact center user device. The instructions via the one or more processors include determine, by the first contact center software service and based on stored data associated with one or more of the prompt or an account of the contact center user device, to address the prompt using a second contact center software service associated with a second entity. The instructions via the one or more processors connect, based on the determination, the first contact center software service and the contact center user device to second contact center software service. The instructions via the one or more processors receive, at the first contact center software service, a response to the prompt from the second contact center software service. The instructions via the one or more processors train, using online learning techniques, an artificial intelligence agent of the first contact center software service based on the response. The present teachings correspond to computer systems, apparatus, and computer programs recorded on one or more computer storage devices, each configured to perform the actions of the methods.

The teachings herein may include one or more of the following features. The non-transitory computer readable medium where the second entity is a partner of the first entity. The first contact center software service and the second contact center software service are merged in a single screen, graphical user interface, chat box, or a combination thereof, output to the contact center user device. The artificial intelligence agent of the first contact center software service provides a resolution to a user of the contact center user device without contacting the second contact center software service after a response is provided to a questions a predetermined number of times. The artificial intelligence agent of the first contact center software service queries the stored data and, if a question was asked and answered successfully a predetermined number of times, the artificial intelligence agent of the first contact center software service provides responses from past prompts. The non-transitory computer readable medium is part of a video conference program or a video conference application. The teachings may include hardware, a method or process, or computer software on a computer-accessible medium.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   receiving, by a first contact center software service associated with a first entity, a prompt from a contact center user device;
   determining, by the first contact center software service and based on stored data associated with one or more of the prompt or an account of the contact center user device, to address the prompt using a second contact center software service associated with a second entity that is separate from the first entity;
   connecting, based on the determination, the first contact center software service and the contact center user device to the second contact center software service;
   receiving, at the first contact center software service, a response to the prompt from the second contact center software service; and
   training, using online learning techniques, an artificial intelligence agent of the first contact center software service based on the response received from the second contact center software service during a merged contact session;
   wherein the second contact center software is seamlessly added into an existing contact center engagement so that the merged contact session includes the first contact center software service and the second contact center software in a unified service area so that the contact center user device is in communication with the first contact center service and the second contact center service without the contact center user device having to establish a new connection or being transferred.

2. The method of claim 1, wherein the stored data comprises at least one of: logged data or historical data associated with the account, usage data of an electronic device, or data about the account stored at the first contact center software service.

3. The method of claim 1, wherein the determination to address the prompt using the second contact center software service is based on a determination that the prompt relates to a product or a service associated with the second entity.

4. The method of claim 1, wherein determining to address the prompt using the second contact center software service comprises:
   determining that the artificial intelligence agent of the first contact center software service is unable to adequately address the prompt; and
   determining, using the artificial intelligence agent of the first contact center software service and based on speech or text of the prompt or based on the stored data associated with the account, that the prompt is related to a product or a service associated with the second entity, wherein the second entity is a member of a stored set of entities having products or services for use in conjunction with a product or a service of the first entity.

5. The method of claim 1, further comprising:
   matching the prompt from the contact center user device to an intent;
   determining that the prompt is not related to the first contact center; and
   determining the second contact center that is related to the intent from the contact center user device,
   wherein the prompt from the contact center user device is received via a screen, chat box, graphical user interface, or a combination thereof where the first contact center software service communicates with a user of the contact center user device.

6. The method of claim 1, wherein the merged contact session includes the first contact center software of the first entity, the second contact center software service of the second entity, and the contact center user device in a single screen, chat box, graphical user interface, or a combination thereof.

7. The method of claim 1, wherein the artificial intelligence agent of the first contact center software service is capable of providing a resolution to a user of the contact center user device without contacting the second contact center software service after a response is provided to questions in the merged contact session a predetermined number of times.

8. The method of claim 1, wherein the second entity is a partner of the first entity and the second entity is connectable to the first entity in real time in the merged contact session via the first contact center software service.

9. An apparatus comprising:
   a memory; and
   a processor configured to execute instructions stored in the memory to:
   receive, by a first contact center software service associated with a first entity, a prompt from a contact center user device;
   determine, by the first contact center software service and based on stored data associated with one or more of the prompt or an account of the contact center user device, to address the prompt using a second contact center software service associated with a second entity that is separate from the first entity;
   connect, based on the determination, the first contact center software service and the contact center user device to the second contact center software service;
   receive, at the first contact center software service, a response to the prompt from the second contact center software service; and
   train, using online learning techniques, an artificial intelligence agent of the first contact center software service based on the response received from the second contact center software service during a merged contact session;
   wherein the second contact center software is seamlessly added into an existing contact center engagement so that the merged contact session includes the first contact center software service and the second contact center software in a unified service area so that the contact center user device is in communication with the first contact center service and the second contact center service without the contact center user device having to establish a new connection or being transferred.

10. The apparatus of claim 9, wherein the memory is configured to store the stored data, and wherein the stored data comprises one or more of: logged data, historical data associated with the account, usage data of an electronic device, data about the account stored at the first contact center software service, or a combination thereof.

11. The apparatus of claim 9, wherein the artificial intelligence agent determines that the prompt relates to a product or service associated with the second entity and determines that the second contact center software service should be connected to address the prompt.

12. The apparatus of claim 9, wherein the processor executes the instructions stored in the memory to:
   determine that the artificial intelligence agent of the first contact center software service is unable to adequately address the prompt; and
   determine, using the artificial intelligence agent of the first contact center software service and based on speech or text of the prompt or based on the stored data associated with the account, that the prompt is related to a product or a service associated with the second entity, wherein the second entity is a member of a stored set of entities having products or services for use in conjunction with a product or a service of the first entity.

13. The apparatus of claim 9, further comprising:
   an intent matching engine that matches the prompt from the contact center user device to an intent, in order to determine that the prompt is not related to the first contact center, and to determine the second contact center that is related to the intent from the contact center user device,
   wherein the first contact center software service, upon receiving the prompt, generates the merged contact session with a chat box, screen, graphical user interface, or a combination thereof so that the artificial intelligence agent of the first contact center software service and the second contact center service are connected with a user.

14. The apparatus of claim 9, wherein the merged contact session includes the second contact center software service of the second entity, the first contact center software service of the first entity, and the contact center user device into a single screen, a single chat box, single graphical user interface, or a combination thereof.

15. A non-transitory computer readable medium storing instructions operable to cause one or more processors to perform operations comprising:
- receive, by a first contact center software service associated with a first entity, a prompt from a contact center user device;
- determine, by the first contact center software service and based on stored data associated with one or more of the prompt or an account of the contact center user device, to address the prompt using a second contact center software service associated with a second entity that is separate from the first entity;
- connect, based on the determination, the first contact center software service and the contact center user device to the second contact center software service;
- receive, at the first contact center software service, a response to the prompt from the second contact center software service; and
- train, using online learning techniques, an artificial intelligence agent of the first contact center software service based on the response received from the second contact center software service during a merged contact session;
- wherein the second contact center software is seamlessly added into an existing contact center engagement so that the merged contact session includes the first contact center software service and the second contact center software in a unified service area so that the contact center user device is in communication with the first contact center service and the second contact center service without the user having to establish a new connection or being transferred.

16. The non-transitory computer readable medium of claim 15, wherein the second entity is a partner of the first entity.

17. The non-transitory computer readable medium of claim 15, wherein the merged contact session includes the first contact center software service, the second contact center software service, and the contact center user device in a single screen, graphical user interface, chat box, or a combination thereof.

18. The non-transitory computer readable medium of claim 15, wherein the artificial intelligence agent of the first contact center software service provides a resolution to a user of the contact center user device without contacting the second contact center software service after a response is provided to a questions a predetermined number of times.

19. The non-transitory computer readable medium of claim 15, wherein the artificial intelligence agent of the first contact center software service queries the stored data and, if a question was asked and answered successfully a predetermined number of times, the artificial intelligence agent of the first contact center software service provides responses from past prompts.

20. The non-transitory computer readable medium of claim 15, further comprising:
- matching the prompt from the contact center user device to an intent;
- determining that the prompt is not related to the first contact center; and
- determining the second contact center that is related to the intent from the contact center user device,
- wherein the non-transitory computer readable medium is part of a video conference program or a video conference application.

* * * * *